J. O. Mahony.
Dray Saddle.

No. 3,513. Reissued Jun. 22, 1869.

Witnesses:
Theo Trische
Wm. Trevin

Inventor:
Jno O. Mahony
Per Munn & Co
Attorneys

N. PETERS, PHOTO-LITHOGRAPHER, WASHINGTON, D. C.

United States Patent Office.

JOHN O'MAHONY, OF SAVANNAH, GEORGIA.

*Letters Patent No.* 77,310, *dated April* 28, 1868; *reissue No.* 3,513, *dated June* 22, 1869.

IMPROVEMENT IN DRAY-SADDLE.

The Schedule referred to in these Letters Patent and making part of the same.

*To all whom it may concern:*

Be it known that I, JOHN O'MAHONY, of Savannah, in the county of Chatham, and State of Georgia, have invented a new and valuable Improvement in Dray-Saddles; and I do hereby declare that the following is a full, clear, and exact description of the construction and operation of the same, reference being had to the annexed drawings, making a part of this specification, and to the letters and figures of reference marked thereon.

Figure 1, of the drawings, is a side view of my invention.

My invention relates to saddles for dray-horse harness; and

It consists mainly in a novel construction and arrangement of devices whereby the saddle is made to conform to the shape of the back of a horse with more than ordinary exactness, and a very durable saddle of the kind specified obtained, which will not chafe nor injure the horse.

The letter A, of the drawings, represents the exterior portion of my saddle. It is of heavy leather, and elevated in front like a military riding-saddle, as shown.

The letter B represents a bent wooden bar, grooved longitudinally in the manner shown, to receive the chain that supports the thills of the dray.

The letter C represents a wooden block, secured to the under side of the leather A. A similar block is attached to the opposite side of the saddle. These blocks are slightly bevelled, so as to increase their thickness gradually from their upper edges to their longitudinal centres, and from thence downward, to gradually lessen their thickness. They are bent at their longitudinal centres, and gradually from thence to their respective ends, to conform to the hollow and withers of the animal's back, and their rear corners are made thin, to conform to the short ribs of the animal.

Figure 1:
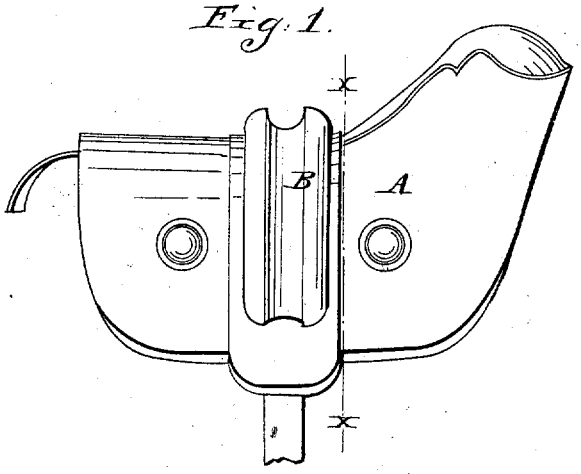
Figure 2:
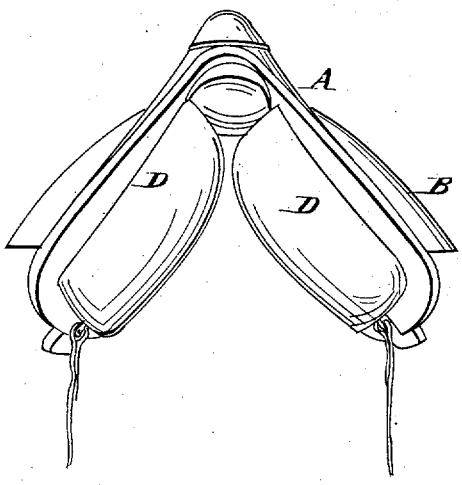
Figure 2 is a front view of the same.
Figure 3:
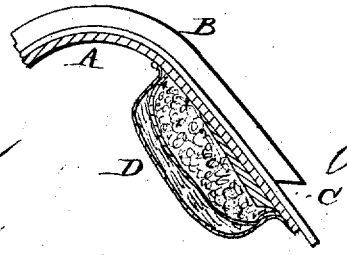
Figure 3 is a transverse section of a portion of the same, taken in the line *x x*, fig. 1.

The letters D represent the pads of my saddle. They are constructed with a covering of soft cloth, and are filled with curled hair, or well-folded unbroken straw. This species of filling is preferable to other kinds, but I do not wish to confine myself to their use alone; nor do I wish to be confined to the use of soft cloth only as a covering for such filling. These pads are arranged in the manner shown on fig. 2, approaching each other very nearly at the point G, and leaving a space above for a circulation of air. They are secured in place by strong threads passing through the cover A, as represented, and to the blocks C by means of threads, which unite it to leather strips that are nailed to said blocks. They have usually an interior lining of cloth, that separates one species of filling from another, and which also serves as means for securing the threads by which the pads are attached to the cover and blocks.

What I claim as my invention, and desire to secure by Letters Patent, is—

1. In a dray-saddle, the bevelled blocks C C, secured to the leather covering A, in combination with the pads D and grooved bar B, said blocks C being secured to the pads at their centres, for the purpose of preventing such pads from flattening upon the back of the animal, under the weight of the dray, as herein shown and described.

2. In a dray-saddle, the bent and bevelled blocks C, when constructed and arranged to operate substantially as and for the purposes specified.

3. A dray-saddle, having cover A, blocks C, and pads D, constructed and arranged to operate substantially as described.

In testimony that I claim the above, I have hereunto subscribed my name, in the presence of two witnesses.

JOHN O'MAHONY. [L. S.]

Witnesses:

JAMES HEAGNY,
WILLIAM WALLACE.